United States Patent
Bulloch, Jr.

[11] 3,818,560
[45] June 25, 1974

[54] METHOD OF MAKING FOAM CUSHIONS

[76] Inventor: Carl Gordon Bulloch, Jr., 76 Kimberly Ave., Asheville, N.C. 28804

[22] Filed: Oct. 19, 1972

[21] Appl. No.: 298,953

Related U.S. Application Data

[62] Division of Ser. No. 130,328, April 1, 1971, Pat. No. 3,719,963.

[52] U.S. Cl. ............................................. 29/91.1
[51] Int. Cl. ............................................. B68g 7/00
[58] Field of Search ......... 29/91.1; 5/351, 354, 361; 267/91

[56] References Cited
UNITED STATES PATENTS

| | | | |
|---|---|---|---|
| 3,005,213 | 10/1961 | Brown et al. | 5/354 |
| 3,210,781 | 10/1965 | Pollock | 267/91 X |
| 3,273,179 | 9/1968 | Ridenour | 5/361 R X |
| 3,459,611 | 8/1969 | Joseph et al. | 5/351 X |
| 3,579,774 | 5/1971 | Shreve | 29/91.1 |

*Primary Examiner*—Andrew R. Juhasz
*Assistant Examiner*—Leon Gilden
*Attorney, Agent, or Firm*—Parrott, Bell, Seltzer, Park & Gibson

[57] ABSTRACT

A method of making a foam cushion for use as a seat, mattress or the like including the steps of foaming a material in an open top mold to form a cellular pad having a dense upper crust, and supportingly positioning an open mesh fabric and an overlying spring assembly in floating relation on the foaming material. The open mesh fabric thereby becomes essentially embedded in the crust to reinforce the same, and the terminal face portions of the spring assembly are adhered to the crust to interconnect the various components. To form an innerspring mattress, the resulting structure is removed from the mold, inverted, and positioned on additional foaming material in a like manner. In a further embodiment, the spring assembly is positioned on the pad after the foaming process is completed. In this case, the originally unattached foam pad may be easily stored or shipped to a point of assembly where the spring assembly is later joined by hog ringing or the like. In order to densify the foaming material in this latter embodiment, a screen member having a weight and outline generally similar to that of the spring assembly may be removably positioned on the foaming material during the foaming process.

10 Claims, 13 Drawing Figures

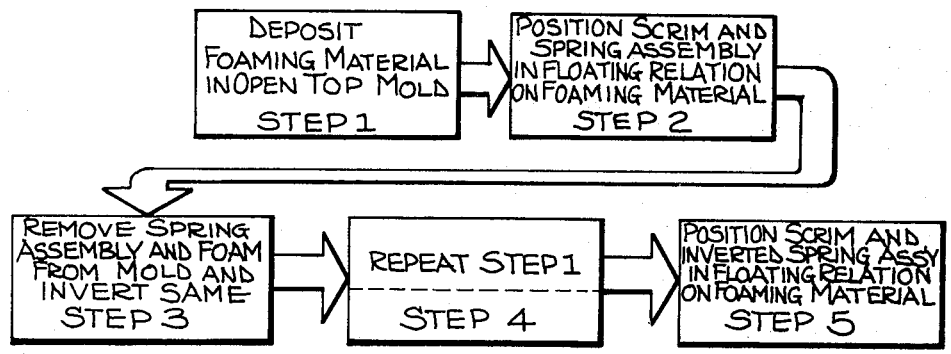
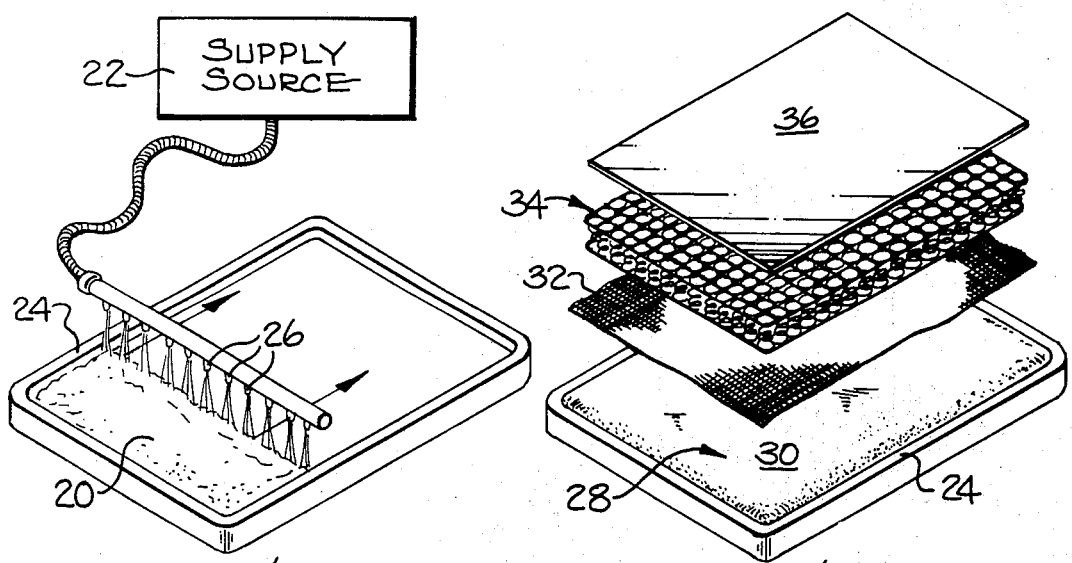
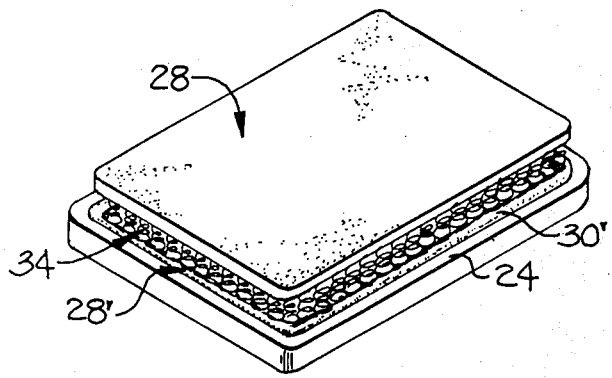

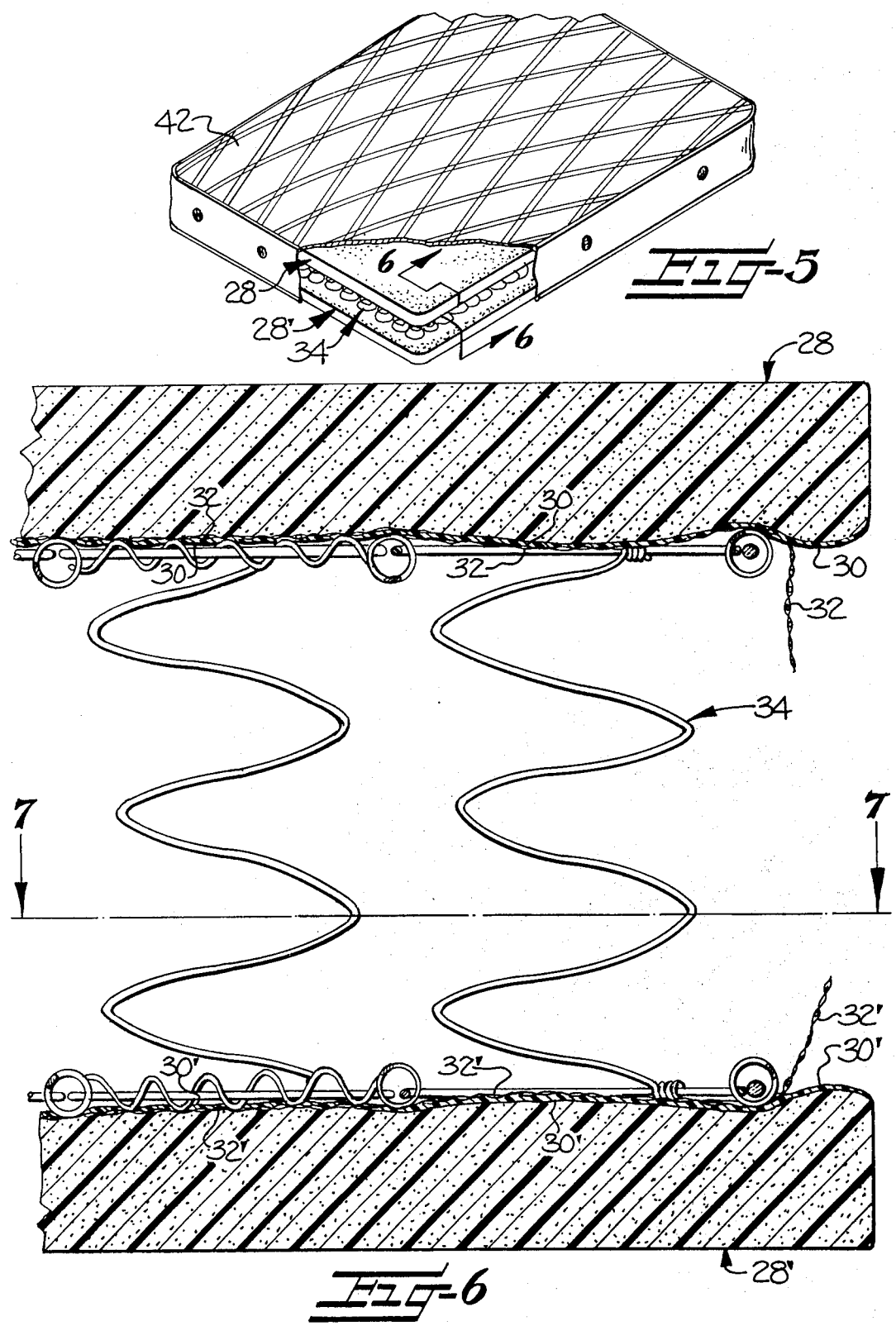

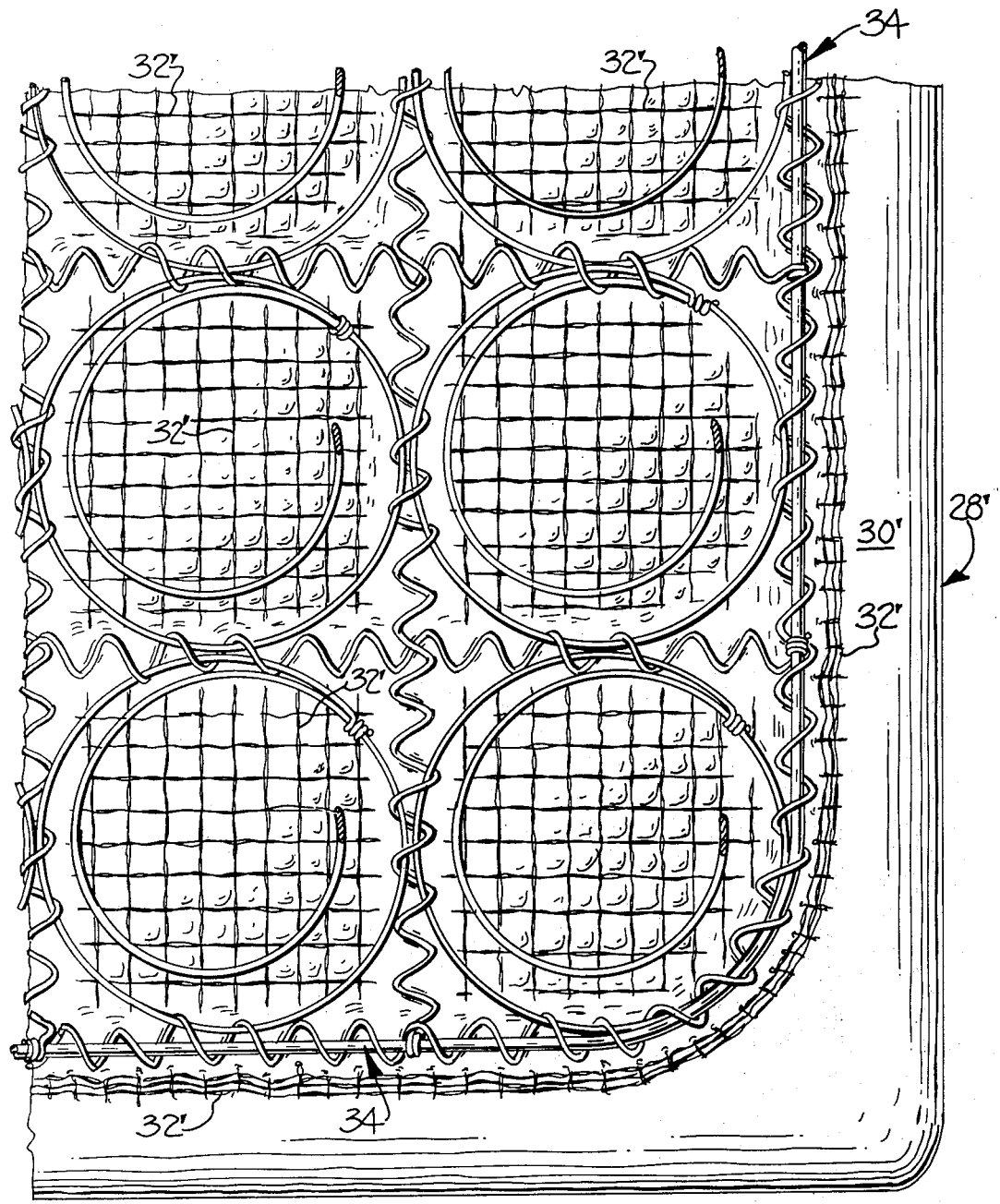

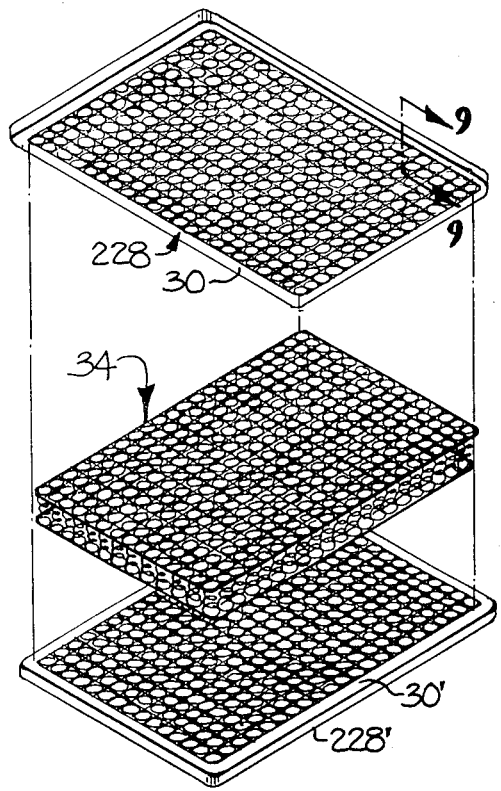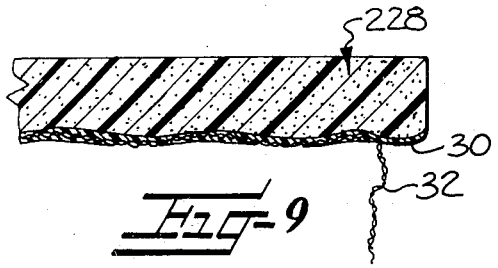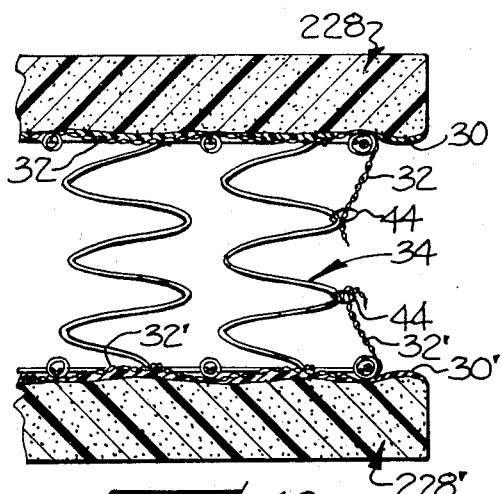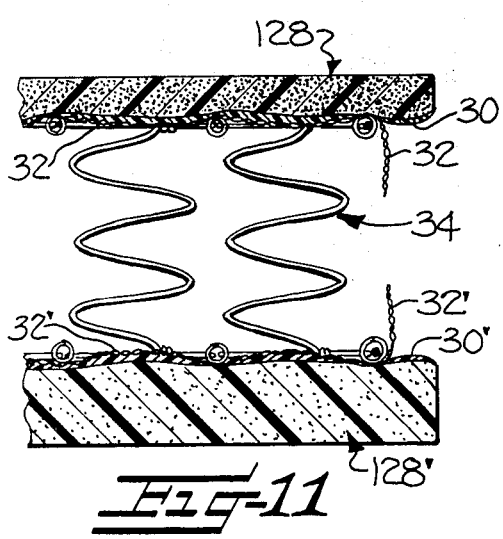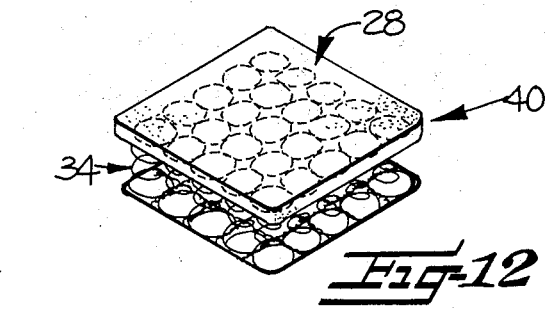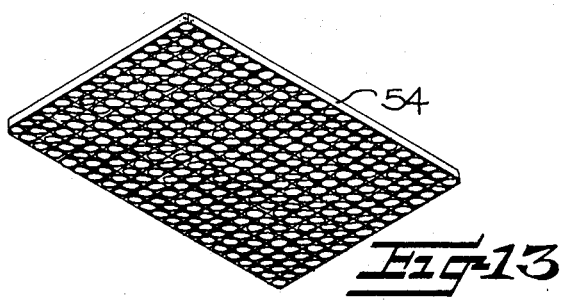

METHOD OF MAKING FOAM CUSHIONS

The present application is a division of application Ser. No. 130,328 filed Apr. 1, 1971 now U.S. Pat. No. 3,719,963.

The present invention relates to a method of fabricating a seat, mattress or the like which comprises an outer foam pad and an underlying spring assembly.

Conventionally, seat cushions of the described type are fabricated by mechanically attaching a preformed foam pad to an underlying spring supporting assembly. In an attempt to prevent the springs from gradually cutting their way through the foam during use and thereby destroying the cushion, it is common to also place a fabric insulator between the springs and foam. After long periods of use however, it has been found that the relative movement between the foam and terminal portions of the springs often breaks down the insulator to permit the springs to enter and cut through the foam. While the use of heavy insulating materials would undoubtedly alleviate this problem, the cost thereof would make the resulting product prohibitively expensive for many applications.

It has also been proposed to fabricate a cushion of the described type by immersing the terminal ends of the spring assembly in a foaming resin such that the spring ends are totally embedded in the foam. While this process is generally more economical than the above method of joinder, it has been found that the embedded springs readily work their way through the foam to reach the upper surface. Thus, the resulting product is commercially unsatisfactory.

It is accordingly an object of the present invention to provide an economical method of producing a foam cushion, and which is capable of producing a product which will not break down under hard and prolonged use.

It is another object of the present invention to provide a method for making an interconnected foam pad and spring assembly wherein the spring assembly will not cut through the foam material during use.

It is a further object of the present invention to provide a method for making a foam cushion pad having a fabric reinforced substantially unbroken dense outer crust capable of preventing penetration by an adjacent wire spring assembly during prolonged use.

It is an additional object of the present invention to provide a process for embedding a reinforcing fabric essentially within the dense outer crust of a foaming resin material, and for joining a spring assembly thereto without cutting or rupturing the crust.

It is another object of the present invention to provide a method for making an innerspring foam mattress having upper and lower foam pads separated by an intermediate spring assembly, and wherein the oppositely facing surfaces of the pads include a fabric reinforced dense outer crust serving to prevent the spring assembly from penetrating into and cutting through the foam pads.

These and other objects and advantages of the present invention are achieved in the embodiments illustrated herein by the provision of a method which comprises the steps of foaming a predetermined quantity of a foamable material in an open top mold to form a resilient cellular pad having a dense upper crust, and supportingly positioning an open mesh fabric and an overlying spring assembly in floating relation on the foaming material during the foaming process. This procedure produces a product wherein the mesh fabric is essentially embedded and thereby secured in the upper crust to reinforce the same, and the terminal portions of the spring assembly rest upon and adhere to the upper crust without significantly penetrating the same. In another embodiment, the spring assembly is positioned on the upper crust after the foaming process has been completed, and the assembly is then secured to the crust by suitable interconnecting means. In either case, the upper crust is substantially uninterrupted or unbroken to provide a continuous substantially impenetrable layer serving to prevent the spring assembly from breaking through to the soft interior of the pad during use.

Some of the objects of the invention having been stated, other objects will appear as the description proceeds, when taken in connection with the accompanying drawings, in which FIG. 1 is a flow chart illustrating the steps employed in carrying out one embodiment of the present invention;

FIG. 2 is a schematic illustration of Step 1 and 4 as seen in FIG. 1;

FIG. 3 is a schematic illustration of Step 2 of the process, and further illustrating a weight applying means for densifying the foaming material;

FIG. 4 is a schematic view of the product at the conclusion of Step 5;

FIG. 5 is a perspective view, partly sectioned, of an innerspring mattress fabricated by the process of the present invention;

FIG. 6 is an enlarged cross-sectional view taken substantially along the line 6—6 of FIG. 5;

FIG. 7 is a plan view taken substantially along the line 7—7 of FIG. 6;

FIG. 8 is an exploded perspective view illustrating the product formed by one embodiment of the present invention wherein the spring assembly is joined to upper and lower foam pads after the foaming process has been completed;

FIG. 9 is a cross-sectional view taken substantially along the line 9—9 of FIG. 8;

FIG. 10 is a cross-sectional view of a portion of a mattress formed by the embodiment of the invention shown in FIG. 8 and illustrating the hog ringing interconnection between the spring assembly and foam pads;

FIG. 11 is a cross-sectional view of a mattress formed according to the present invention and wherein the upper foam pad is more dense and thinner than the lower pad;

FIG. 12 is a perspective view of a seat cushion formed by the process of the present invention; and FIG. 13 is a perspective view of a screen member which may be employed in fabricating the product shown in FIG. 8.

Referring more specifically to the drawings, FIG. 1 illustrates a process for fabricating a seat as shown in FIG. 12 or an innerspring mattress as shown in FIG. 5 according to one embodiment of the present invention. Specifically, a predetermined quantity of a foamable material 20 is fed from a suitable source of supply 22 and sprayed or otherwise deposited in an open top mold 24 through a number of nozzles 26 or the like. After the foamable material 20 is received in the mold, the evolution of carbon dioxide or other blowing agent causes the material to expand and rise within the mold to form a resilient cellular pad 28. In addition, it is a characteristic of the ingredients of the foamable material employed with the present invention that a tough dense outer crust 30 (FIG. 6) is formed along the upper surface of the pad during the foaming process. The exact reasons for the formation of this crust are not fully understood, but it is believed that such formation is dependent upon contact with the atmosphere since a crust of this type is not formed along the bottom and side walls of the pad which are in contact with the mold surfaces. Also, it will be appreciated that the thickness of the crust 30 as seen in FIG. 6 is exaggerated for clarity of illustration. The actual thickness is on the order of one-sixteenth inch or less.

After the foamable material 20 has been deposited in the mold 24, an open mesh fabric 32 or scrim is supportingly positioned on the material during the foaming process so as to be floatingly carried thereon. By this procedure, the fabric 32 becomes essentially embedded and thereby secured in the upper crust, note FIGS. 6 and 7.

In one embodiment, a wire spring assembly 34 of conventional construction is supportingly positioned on the foaming material and over the mesh fabric so as to be floatingly carried thereon during the foaming process. The terminal portions along one face of the spring assembly 34 thus rest upon the crust 30 without significantly penetrating the same, and the curing of the crust will produce a self-adherence between the spring assembly and resulting pad to maintain an interconnection between these components. In addition, it will be understood that the weight of the spring assembly has a densifying effect on the foaming material by somewhat retarding its upward expansion. In certain cases, it may be desired to further densify the foaming material, and in such cases it is within the contemplation of the present invention to apply a controlled downwardly directed force on the spring assembly during the foaming process. As shown in FIG. 3, this force is represented by a weight member 36 positioned above the spring assembly 34.

As illustrated in FIG. 3, the open mesh fabric 32 may be positioned separately and prior to the positioning of the spring assembly 34 on the foaming material. Alternatively, it will be understood that the fabric 32 may be presecured to the spring assembly, such that the fabric and spring assembly are positioned concurrently on the foaming material. In either event, the fabric and spring assembly are totally supported by the material.

The timing of the positioning of the fabric and spring assembly on the foaming material effects the density of the resulting pad, but does not otherwise appear to be a critical factor. Preferably however, the spring assembly is positioned during the latter portion of the foaming process since the crust will have at least partially formed and thus there is assurance that the crust will support the weight of the spring assembly.

From the above, it will be apparent that a seat unit 40 as seen in FIG. 12 may be fabricated by following only Steps 1 and 2 as described in FIG. 1. Specifically, the seat unit comprises the pad 28 forming the upper cushion thereof, the mesh fabric 32 (not seen in FIG. 12), and the spring assembly 34. Preferably, the unit is subsequently covered by a suitable fabric in the conventional manner.

To fabricate an innerspring foam cushion, mattress, or the like as illustrated for example in FIG. 5, and which comprises spaced parallel pads 28, 28' joined by the intermediate spring assembly 34, the process is continued as indicated in Steps 3, 4, and 5 of FIG. 1. In particular, the subassembly comprising the pad 28, mesh fabric 32, and spring assembly 34, is removed or stripped from the mold 24. A predetermined quantity of an additional foamable material 20 is then deposited in the same or similar mold 24 such that the additional material expands and rises to form the second resilient cellular pad 28' having physical characteristics similar to those of the first pad 28. The above subassembly is then inverted, and a second open mesh fabric 32' and the inverted subassembly are supportingly positioned on the material 20 so as to be floatingly carried thereby. This produces the structure as shown in FIG. 4, which when stripped from the mold represents the substantially completed mattress shown in FIG. 6. Preferably, however, a fabric covering 42 as shown in FIG. 5, is positioned to completely surround a mattress.

In fabricating the above described mattress, it will be understood that the weight number 36 preferably approximately equals the weight of the pad 28 whereby the weight of the pad 28 may then serve as a force applying means on the second pad 28'. By this arrangement, the two pads will have similar densities, assuming of course that a similar amount of the material 20 is utilized in forming both pads. It will also be understood however, that the weight of the member 36 may be increased or decreased in such a manner that the first pad is either more dense or less dense than the second pad. FIG. 11 illustrates an example of the structure resulting from this procedure wherein the upper pad 128 is more dense and thinner than the lower pad 128'. Such a structure may be desirable in certain cases where it is desired to reduce the cost of the finished product.

In another embodiment of the process according to the present invention, the spring assembly is positioned on the upper crust of the pad after the foaming process has been completed with the mesh fabric 32 embedded in the crust as described above. The spring assembly may then be interconnected to the upper crust by hog ringing the same to the mesh fabric utilizing a plurality of fastener elements 44 positioned along the periphery of the mattress as seen in FIG. 10. Alternatively, the spring assembly could be secured utilizing a suitable adhesive. In connection with this process, it may be desired to maintain a weighted screen member 54 (FIG. 13) on the foaming material during the foaming process and in overlying relation to the mesh fabric to retard expansion of the material and thereby densify the same. Preferably, the screen member should be coated with a conventional release agent such as wax or Teflon to prevent adherence to the crust 30 and thereby permit removal of the screen at the termination of the foaming process. Also, it may be desirable to employ a screen member having a weight and surface configuration substantially similar to that of the spring assembly. By this arrangement, the material 20 is densified in a manner similar to that which would occur had the spring assembly been positioned on the material according to the process described above. Also, by providing a surface configuration for the screen member similar to the spring assembly, the spring assembly will be adapted to conformingly mate with the indentations formed in the pads by the screen. This embodiment is shown somewhat schematically in FIG. 8 which illustrates the surface configuration of the spring assembly indented into the crust of the upper and lower pads 228, 228' respectively, as formed by the surface configuration of the screen member 54 as seen in FIG. 13. When brought together, the spring assembly and pads form the completed mattress as shown in FIG. 10. It will be understood of course, that the spring assembly 34 itself could serve as the screen member in the above process.

It will be appreciated that the embodiment of the invention illustrated in FIGS. 8-10 would be advantageous in cases where the mattress must be stored or shipped a considerable distance, since the pads could be stored or shipped without the relatively heavy and bulky spring assembly. Thus the spring assembly could be attached at a time and place remote from the formation of the pads.

The open mesh fabric 32 or 32' employed with the present invention is generally conventional, and may for example, comprise four by four cotton mesh fabric (defined as having four openings per inch in each of the two transverse directions), or five by five cotton mesh fabric.

The specific ingredients of the foaming material 20 are also generally conventional, and may comprise a variety of well-known resin foaming compositions which are adapted to expand and cure in situ as it is poured into the mold and which is self curing at room temperature and thus does not require any after treatment such as heating. A foam which meets the above requirements and which also produces a dense outer crust as described above is chemically blown urethane foam.

A specific non-limiting example of a suitable urethane foaming material is set forth below:

| INGREDIENT | UNITS BY WEIGHT |
|---|---|
| Niax polyol 50-48 | 100 |
| Water | 2.5 |
| Dabco-33LV (catalyst) | 1.5 |
| Carbon black | 3.0 |
| Niax isocyanate SF-50 | 100 |

Niax polyol 50-48 is a trademark of the Union Carbide Corporation, and comprises a reactive polyglycol. Niax isocyanate SF-50 is also a trademark of Union Carbide, and comprises a quasi free polymer of isocyanate and polyalkylene glycol. Dabco-33LV is a trademark of Houdry Process and Chemical Company, and comprises a solution containing one part by weight triethylenediamine and two parts dipropylene glycol. The carbon black serves merely as a coloring agent. The above formulation produces a product having a foam density of about 4.1 pounds per cubic foot.

In the drawings and specification, there have been set forth preferred embodiments of the invention, and although specific terms are employed, they are used in a generic and descriptive sense only and not for purposes of limitation.

That which is claimed is:

1. A method of making a seat, mattress or the like comprising the steps of
   foaming in an open top mold a predetermined quantity of foamable material capable of expanding and rising within the mold to form a resilient cellular pad having a dense upper crust, and
   supportingly positioning an open mesh fabric and an overlying spring assembly on the foaming material during the foaming process and without any substantial direct support from the mold, and with the weight of the scrim and spring assembly being such as to permit the same to be floatingly carried on the foaming material without substantially sinking thereinto such that the mesh fabric becomes essentially embedded in the upper crust to reinforce the same with the terminal portions along one face of the spring assembly resting upon and adhering to the upper crust without significantly penetrating the same.

2. The method as defined in claim 1 including the further step of presecuring the open mesh fabric to the spring assembly, and wherein the step of positioning the open mesh fabric and spring assembly on the foaming material includes concurrently positioning the same on the foaming material.

3. The method as defined in claim 1 wherein the step of positioning the open mesh fabric and spring assembly on the foaming material includes positioning the open mesh fabric separately and prior to the positioning of the spring assembly.

4. The method as defined in claim 1 wherein the foamable material produces a chemically blown urethane foam adapted to cure at room temperature.

5. A method of making an innerspring foam cushion, mattress or the like comprising spaced parallel resilient pads joined by an intermediate spring assembly comprising the steps of
   foaming in an open top mold a predetermined quantity of foamable material capable of expanding and rising within the mold to form a first resilient cellular pad having a dense upper crust,
   supportingly positioning a first open mesh fabric and an overlying spring assembly on the material during the foaming process so as to be floatingly carried thereon whereby the first mesh fabric becomes essentially embedded in the first pad upper crust to reinforce the same, and the terminal portions along one face of the spring assembly rest upon and adhere to the upper crust without significantly penetrating the same to thereby form a subassembly comprising the first pad, first mesh fabric, and spring assembly,
   removing the subassembly from the mold,
   foaming in a open top mold a predetermined quantity of additional foamable material capable of expanding and rising within the mold to form a second resilient cellular pad having physical characteristics similar to those of the first pad, and
   inverting the subassembly and supportingly positioning a second open mesh fabric and the inverted subassembly on the additional material during the foaming process whereby the opposite face of the spring assembly is secured to the second pad in a manner similar to that of the first pad.

6. The method as defined in claim 5 wherein the step of positioning a first open mesh fabric and an overlying spring assembly on the foaming material includes exerting a controlled downwardly directed force on the spring assembly to retard expansion of the foaming material and obtain an increased density in the first cellular pad.

7. The method as defined in claim 6 wherein the downwardly directed force is approximately equal to the weight of the first pad whereby the weight of the first pad may be utilized as a force applying means on the second pad to obtain similar densities in both pads.

8. A method of making a spring supported seat, mattress, or the like comprising the steps of foaming in an open top mold a predetermined quantity of foamable material capable of expanding and rising within the mold to form a resilient cellular pad having a dense upper crust, supportingly positioning an open mesh fabric on the foaming material during the foaming process and without any substantial direct support from the mold, and with the weight of the scrim being such as to permit the same to be floatingly carried on the foaming material without substantially sinking thereinto and such that the mesh fabric becomes essentially embedded in the upper crust to reinforce the same, positioning a spring assembly on the upper crust of the cellular pad after the foaming process has been completed such that the terminal portions along one face of the spring assembly rest upon the upper crust without significantly penetrating the same, and interconnecting the thus positioned spring assembly to the cellular pad.

9. The method as defined in claim 8 including the step of maintaining a screen member on the foaming material during the foaming thereof and in overlying relation to the mesh fabric to retard expansion of the material and thereby densify the same.

10. The method as defined in claim 9 wherein the screen member has a weight and surface configuration substantially similar to that of the spring assembly.

* * * * *